Patented May 23, 1944

2,349,318

UNITED STATES PATENT OFFICE 2,349,318

PYRIDINE COMPOUND AND PROCESS FOR THE MANUFACTURE THEREOF

Kurt Westphal, Wuppertal-Vohwinkel, Germany, assignor to Winthrop Chemical Company, Inc., New York, N. Y., a corporation of New York No Drawing. Application February 3, 1940, Serial No. 317,119. In Germany February 21, 1939

15 Claims. (Cl. 260—297.5)

This invention relates to pyridine compounds and to processes of manufacturing the same.

In accordance with the present invention pyridine compounds of the following formula are obtainable:

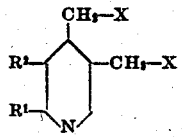

wherein $R^1$ stands for one of the substituents hydrogen and methyl, $R^2$ for one of the substituents hydrogen and alkoxy groups and X for a substituent of the group consisting of amino and chlorine groups, with other words, 4.5-bis-aminomethyl-pyridines and bis-chloromethyl pyridines are obtainable which are convertible into 4.5-bis-hydroxy-methyl pyridines; the said compounds have proved to be useful intermediates in the manufacture of vitamin $B_6$, particularly the compounds of the formula

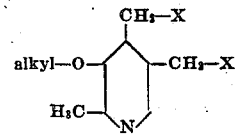

wherein X stands for a substituent of the group consisting of amino and chlorine groups.

According to my invention the 4.5-bis-aminomethyl-pyridine compounds are obtainable by reacting upon a 4.5-bis-cyano-pyridine with 4 mols of hydrogen in the presence of a hydrogenating catalyst. As the hydrogenating catalyst the catalysts usual for this purpose, for instance, nickel or metal catalysts of the platinum group, for instance, colloidal palladium, may be used, advantageously in the presence of a dilute aqueous acid, such as hydrochloric acid. It is most surprizing that the 4.5-bis-cyanopyridines can be converted into the 4.5-bis-aminomethyl-pyridines in such a convenient manner in view of the known fact that the reduction of nitriles to the corresponding aminomethyl compounds normally takes place with the formation of a mixture of products. This also applies to the catalytic reduction. Mono- and dibenzylamine as well as ammonia and benzaldehyde have been obtained when catalytically hydrogenating benzonitrile in the presence of colloidal palladium. The course of the reaction has been explained by the formation first of an aldimine by the action of 1 mol of hydrogen which aldimine is hydrolyzed to benzaldehyde and ammonia; 3 mols of the benzaldehyde formed and 2 mols of ammonia then are believed to react with the formation of hydrobenzamide which on its part is converted into a mixture of mono- and dibenzylamine by hydrogenation. Also the use of specific reducing agents, such as chromous acetate with the addition of potassium hydroxide solution, has not resulted in a uniform reaction. 2-cyanopyridine for instance is converted into 2-methylpyridine and ammonia in the presence of an excess of the reducing agent. 2.6-dicyano-pyridine yields only in a poor yield the 2.6-bis-amino methyl-pyridine, whereas 6-methyl-2-aminomethyl-pyridine-hydrochloride is obtained as a by-product in view of the splitting off of ammonia and the conversion of the 1-cyano group into the amino methyl group. Nothing is known about the behaviour of cyclic dinitriles having the nitrile groups in ortho-position to one another to hydrogenating agents. In this case the formation of the so-called ortho-condensation products was to be expected particularly, since the hydrogenation takes place in stages. Also similar by-reactions were to be expected as were known for the 2.6-dicyanopyridine, since the hydrogenating agent is to be used in excess as to the one cyano group when reducing a dicyano compound. In view of the said circumstances it is most surprizing that the 4.5-dicyanopyridines can be converted into 4.5-bis-aminomethyl-pyridines with a good yield by hydrogenation in the presence of a catalyst. According to my present invention the bis-aminomethyl-pyridines may be converted into the corresponding bis-hydroxymethyl-pyridines by acting thereupon with nitrous acid or with a product capable of splitting off nitrous acid. Preferably amylnitrite is used as a product splitting off the nitrous acid. The reaction is performed in the presence of a solvent which is inert to the starting-materials and the reaction product is isolated in the usual manner. Advantageously they are separated in the form of the addition compounds with picric acid or similar compounds. The 4.5-bis-hydroxymethyl-pyridines are thus obtainable in a satisfactory yield. This is most surprizing, since also in this case in view of the ortho-position of the two aminomethyl groups a so-called ortho-condensation was to be expected. When using 2-methyl-3-alkoxy-4.5-bis-aminomethyl-pyridines as starting-materials in this reaction, alkyl ethers are obtained which have proved to be identical with the alkyl ethers of vitamin $B_6$. By dealkylation of the ethers vitamin $B_6$ itself is obtainable. Thus the above described reactions represent a synthetic method for the manufacture of vitamin B6.

In accordance with another feature of my present invention the 4.5-bis-aminomethyl-pyridines can be converted in a still more convenient manner into the 4.5-bis-hydroxymethyl-pyridines by first converting them into the 4.5-bis-chloromethyl-pyridines by reacting thereupon with nitrous acid or with a product capable of splitting off nitrous acid in the presence of concentrated hydrochloric acid, whereupon the 4.5-bis-chloromethyl-pyridine-hydrochlorides thus obtainable are hydrolyzed to the 4.5-bis-hydroxymethyl-pyridines in the manner known per se, for instance by treatment with potassium carbonate.

The invention is illustrated by the following examples without, however, being restricted thereto:

*Example 1*

1.5 grams of pyridine 3.4-dinitrile are dissolved in 200 ccs. of dilute hydrochloric acid and shaken with 1 gram of colloidal palladium in hydrogen atmosphere until about 1300 ccs. of hydrogen have been taken up. The catalyzer is filtered off, the filtrate is evaporated to dryness under reduced pressure and the crystalline residue recrystallized from dilute alcohol. The hydrochloride of the 3.4-bis-aminomethyl-pyridine is obtained in a good yield in colorless crystals melting at 274° C.

1.25 grams of 4.5-bis-aminomethyl-pyridine-hydrochloride are dissolved in a mixture of 10 ccs. of water and 20 ccs. of alcohol and treated at room temperature with 1.1 ccs. of amylnitrite. After 12 hours the nitrite has been consumed. The mixture is then treated with further 5 ccs. of amylnitrite and heated for some time on the water-bath. It then is evaporated to dryness under reduced pressure, the residue taken up in water, shaken out with ether and the aqueous solution treated with picric acid. The precipitate is filtered with suction. After recrystallization yellow needles of the 4.5-bis-hydroxymethyl-pyridine-picrate are obtained which melt at 144° C. The picrate is split in the usual manner. The same picrate is obtained melting at 144° C. if a current of nitrous anhydride is passed through a solution of 5 grams of 4.5-bis-aminomethyl-pyridine (melting at 54° C.) in 30 ccs. of water at 60° C. for some hours and the mixture is worked up as described above.

The said bis-hydroxymethyl compound is also obtained in the following manner:

10 grams of 4.5-bis-aminomethyl-pyridine-hydrochloride are introduced into 100 ccs. of concentrated hydrochloric acid, a solution of 10 grams of sodium nitrite in a small quantity of water is at once added thereto. The mixture is then stirred for some hours at 60° C. until the evolution of nitrogen has ceased and evaporated to dryness under reduced pressure. The residue is taken up in water and treated with potassium carbonate while being ice-cold. White crystals of the 4,5-bis-chloromethyl-pyridine are obtained which melt after recrystallization from a mixture of methylenechloride and petroleum ether at 70° C. By saponification in the usual manner therefrom the 4.5-bis-hydroxymethyl-pyridine is obtained. It forms a picrate melting at 144° C. which is identical with the picrate described above.

The pyridine-3,4-dinitrile used as starting material is obtained by heating pyridine-3,4-dicarboxylic acid diamide with acetic anhydride.

*Example 2*

7.5 grams of 2-methyl-3-methoxy-pyridine-4.5-dinitrile are dissolved in dilute hydrochloric acid and shaken with 1 gram of 25% colloidal palladium in a hydrogen atmosphere until no hydrogen is taken up any more. About 4 liters of hydrogen are taken up. Thereupon the catalyzer is filtered off and the aqueous solution is evaporated to dryness under reduced pressure. The crystalline residue is recrystallized from a mixture of methanol and ether. White crystals of the 2-methyl-3-methoxy-4.5-bis-aminomethyl-pyridine-hydrochloride are obtained which foam up at 197° C. in the melting tube.

2.9 grams of 2-methyl-3-methoxy-4.5-bis-aminomethyl-pyridine-hydrochloride are dissolved in a mixture of 20 ccs. of water and 50 ccs. of alcohol and treated with 1.2 grams of amylnitrite at room temperature. If the nitrite has been consumed, further 5 ccs. of amylnitrite are added and the mixture heated for some time on the water-bath. Thereupon the mixture is evaporated to dryness under reduced pressure. The residue is taken up in water, the aqueous solution saturated with potassium carbonate and extracted with methylenechloride. The methylenechloride solution is dried by means of potassium carbonate, the solution is filtered and the methylene chloride evaporated. The residue is dissolved in chloroform, the chloroform solution three times shaken out with 5 ccs. of water each, the united aqueous extracts are evaporated to dryness under reduced pressure, the residue distilled in vacuo under 4 mms. pressure at a heating-bath temperature of 160° C. A colorless oil is obtained which is dissolved in methylenechloride. On the addition of low boiling petroleum ether colorless crystals separate after some storing in the ice box which melt, eventually after repeated recrystallization, at 89° C. The crystals are identical with the known methylether of the vitamin B6 (Adermin). The melting point of the mixture is not lower than the melting point of the said two products. The 2-methyl-3-methoxy-4.5-bis-hydroxylmethyl-pyridine thus obtained may be converted into the vitamin B6-hydrochloride by saponification.

The same compound is obtained when dissolving 1.25 grams of 2-methyl-3-methoxy-4.5-bis-aminomethyl-pyridine-hydrochloride in 10 ccs. of water, when heating the solution to 60° C. and when stirring after the addition of a solution of 4 grams of sodium nitrite in 20 ccs. of water until the evolution of nitrogen has ceased. After cooling of the mixture it is saturated with potassium carbonate and shaken out with methylenechloride. The methylene chloride solution is three times shaken out with water. The 2-methyl-3-methoxy-4.5-bis-hydroxymethyl - pyridine melting at 89° C. is obtained from the aqueous extract by means of evaporation and sublimation of the residue.

The 2-methyl-3-methoxy-4,5-bis - aminomethyl-pyridine-hydrochloride may also first be converted into the 2-methyl-3-methoxy - 4,5 - bis-chloromethyl-pyridine-hydrochloride melting at 139° C. in the manner indicated in the last paragraph of Example 1. The aforementioned compound may then be transformed into the 2-methyl-3-methoxy-4,5-bis-hydroxymethyl - pyridine by hydrolysis.

The 2-methyl-3-methoxypyridine-4,5 - dinitril (boiling under 0.2 mm. pressure at 110° C.) used as starting material is obtained by heating 2- methyl-3-methoxypyridine-4.5-dicarboxylic acid diamide (melting at 245° C. with decomposition) with acetic anhydride. The said dicarboxylic acid diamide is obtained on causing to react ammonia on 2-methyl-3-methoxy-pyridine-4.5-dicarboxylic acid methylester (boiling under 1 mm. pressure at 126° C.). The 2-methyl-3-methoxy-pyridine-4.5-dicarboxylic acid is obtained according to the process of specification Serial No. 315,754, filed January 26, 1940, Patent No. 2,302,903 granted November 24, 1942.

In an analogous manner the 2-methyl-3-ethoxy-4,5-bis-hydroxymethyl-pyridine melting at 100° C. may be obtained when starting with 2-methyl-3-ethoxy-pyridine-4,5-dinitrile.

I claim:

1. A compound of the formula

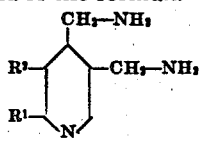

wherein $R^1$ stands for one of the substituents hydrogen and methyl, and $R^2$ for one of the substituents hydrogen and alkoxy groups, and the acid addition salts thereof.

2. A compound of the formula

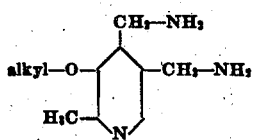

3. The compound of the formula

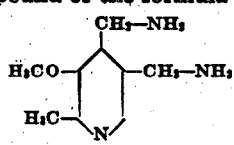

and forming a hydrochloride melting at approximately 197° C.

4. The process which comprises reacting upon a 4.5-bis-cyano-pyridine with 4 mols of hydrogen in the presence of a hydrogenating catalyst and acting upon the 4.5-bis-aminomethyl-pyridine compound formed with an agent selected from the group consisting of nitrous acid and products capable of splitting off nitrous acid.

5. The process which comprises reacting upon a 2-methyl-3-alkoxy-4.5-bis-cyano-pyridine with 4 mols of hydrogen in the presence of a hydrogenating catalyst and acting upon the 2-methyl-3-alkoxy-4.5-bis-aminomethyl-pyridine formed with an agent selected from the group consisting of nitrous acid and products capable of splitting off nitrous acid.

6. The process which comprises reacting upon a 4.5-bis-cyano-pyridine with 4 mols of hydrogen in the presence of a hydrogenating catalyst and acting upon the 4.5-bis-aminomethyl-pyridine compound formed with an agent selected from the group consisting of nitrous acid and products capable of splitting off nitrous acid in the presence of concentrated hydrochloric acid.

7. The process which comprises reacting upon a 2-methyl-3-alkoxy-4.5-bis-cyano-pyridine with 4 mols of hydrogen in the presence of a hydrogenating catalyst and acting upon the 2-methyl-3-alkoxy-4.5-bis-aminomethyl-pyridine formed with an agent selected from the group consisting of nitrous acid and products capable of splitting off nitrous acid in the presence of concentrated hydrochloric acid.

8. The process which comprises reacting upon a 4.5-bis-cyano-pyridine with 4 mols of hydrogen in the presence of a hydrogenating catalyst, acting upon the 4.5-bis-aminomethyl-pyridine compound formed with an agent selected from the group consisting of nitrous acid and products capable of splitting off nitrous acid in the presence of concentrated hydrochloric acid and converting the 4.5-bis-chloromethyl-pyridine compound formed into the corresponding 4.5-bis-hydroxymethyl-pyridine compound by hydrolysis.

9. The process which comprises reacting upon a 2-methyl-3-alkoxy-4.5-bis-cyano-pyridine with 4 mols of hydrogen in the presence of a hydrogenating catalyst, acting upon the 2-methyl-3-alkoxy-4.5-bis-aminomethyl-pyridine formed with an agent selected from the group consisting of nitrous acid and products capable of splitting off nitrous acid in the presence of concentrated hydrochloric acid and converting the 2-methyl-3-alkoxy-4.5-bis-chloromethyl-pyridine compound formed into the corresponding 2-methyl-3-alkoxy-4.5-bis-hydroxymethyl-pyridine compound by hydrolysis.

10. In the process of manufacturing pyridine derivatives the step which comprises reacting upon a 4.5-bis-cyano-pyridine with 4 mols of hydrogen in the presence of a hydrogenating catalyst.

11. In the process of manufacturing pyridine derivatives the step which comprises reacting upon a 2-methyl-3-alkoxy-4.5-bis-cyano-pyridine with 4 mols of hydrogen in the presence of a hydrogenating catalyst.

12. In the process of manufacturing pyridine derivatives the step which comprises reacting upon a 4.5-bis-aminomethyl-pyridine with an agent selected from the group consisting of nitrous acid and products capable of splitting off nitrous acid.

13. In the process of manufacturing pyridine derivatives the step which comprises acting upon a 2-methyl-3-alkoxy-4.5-bis-aminomethyl-pyridine with an agent selected from the group consisting of nitrous acid and products capable of splitting off nitrous acid.

14. In the process of manufacturing pyridine derivatives the step which comprises reacting upon a 4.5-bis-aminomethyl-pyridine with an agent selected from the group consisting of nitrous acid and products capable of splitting off nitrous acid in the presence of concentrated hydrochloric acid.

15. In the process of manufacturing pyridine derivatives the step which comprises acting upon a 2-methyl-3-alkoxy-4.5-bis-aminomethyl-pyridine with an agent selected from the group consisting of nitrous acid and products capable of splitting off nitrous acid in the presence of concentrated hydrochloric acid.

KURT WESTPHAL.